(12) United States Patent
Mone et al.

(10) Patent No.: US 12,703,252 B2
(45) Date of Patent: Aug. 11, 2026

(54) BATTERY CELL CAN INSERT

(71) Applicant: GM Global Technology Operations LLC, Detroit, MI (US)

(72) Inventors: Nikhil Mone, Rochester Hills, MI (US); Binsong Li, Troy, MI (US); Srilakshmi Katar, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 314 days.

(21) Appl. No.: 18/543,171

(22) Filed: Dec. 18, 2023

(65) Prior Publication Data

US 2025/0196664 A1 Jun. 19, 2025

(51) Int. Cl.

| | |
|---|---|
| ***B60L 50/64*** | (2019.01) |
| ***H01M 10/613*** | (2014.01) |
| ***H01M 10/625*** | (2014.01) |
| ***H01M 10/653*** | (2014.01) |
| ***H01M 50/209*** | (2021.01) |
| ***H01M 50/262*** | (2021.01) |
| ***H01M 50/291*** | (2021.01) |
| ***H01M 50/293*** | (2021.01) |

(52) U.S. Cl.

CPC ........... *B60L 50/64* (2019.02); *H01M 10/613* (2015.04); *H01M 10/625* (2015.04); *H01M 10/653* (2015.04); *H01M 50/209* (2021.01); *H01M 50/262* (2021.01); *H01M 50/291* (2021.01); *H01M 50/293* (2021.01); *H01M 2220/20* (2013.01)

(58) Field of Classification Search

CPC ............. H01M 50/209; H01M 50/262; H01M 50/291; H01M 50/293; H01M 50/249; H01M 10/625; H01M 10/613; H01M 10/653; H01M 10/6554; H01M 2220/20; B60L 50/64

See application file for complete search history.

(56) References Cited

U.S. PATENT DOCUMENTS

| | | | | |
|---|---|---|---|---|
| 2022/0320628 | A1* | 10/2022 | Shin | H01M 10/627 |
| 2023/0027399 | A1* | 1/2023 | Wiegman | B60L 58/26 |
| 2023/0268588 | A1 | 8/2023 | Sun et al. | |
| 2023/0335821 | A1* | 10/2023 | Kim | H01M 50/209 |

FOREIGN PATENT DOCUMENTS

| | | | |
|---|---|---|---|
| CN | 219937113 U | | 10/2023 |
| CN | 220021323 U | * | 11/2023 |

OTHER PUBLICATIONS

German Office Action for German Application No. 102024103769.5; dated Apr. 7, 2025; 5 pages.

* cited by examiner

*Primary Examiner* — Lori Wu

(74) *Attorney, Agent, or Firm* — CANTOR COLBURN LLP

(57) ABSTRACT

A battery cell includes a cell can including a plurality of walls forming a cell stack receiving zone. Each of the plurality of walls includes an inner surface. A cell stack is arranged in the cell stack receiving zone. The cell stack has an outer surface that is spaced from the inner surface of at least one of the plurality of walls. A cell can insert is arranged between the outer surface of the cell stack and the inner surface of the at least one of the plurality of walls. The cell can insert provides structural support and a thermal flow path between the cell stack and the cell can.

20 Claims, 5 Drawing Sheets

90
94
96
106
119
116
166
158
166
5
156
102
104
122
114
100
128
5

90
180
102
156
134
94
173
112
136
166
171
119
122
110
164
128
130
100

173
166
171
169
136
134
122
145
119
140
150
152
142
148
130
128
164

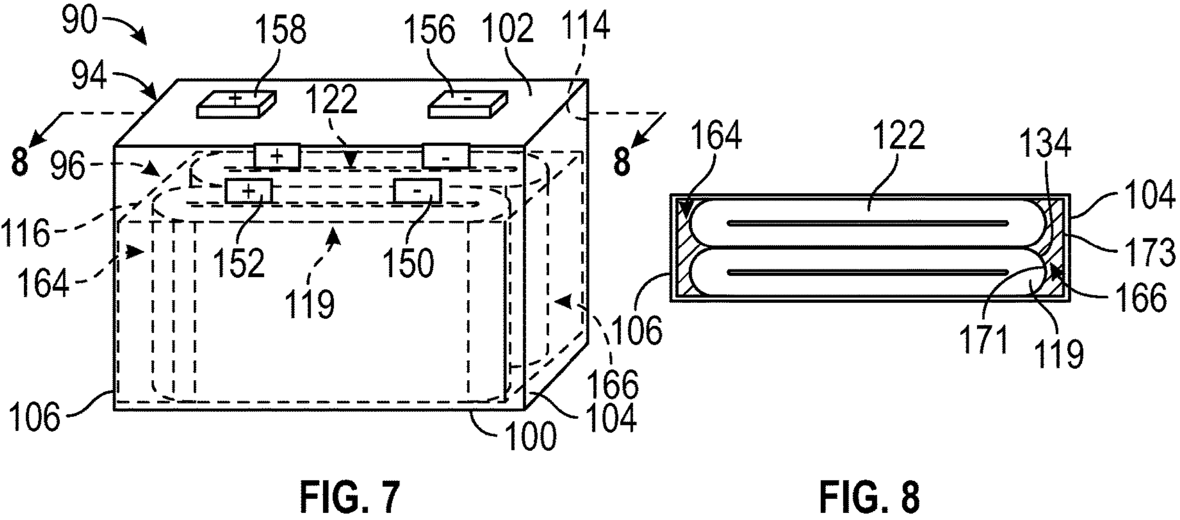
FIG. 7
FIG. 8
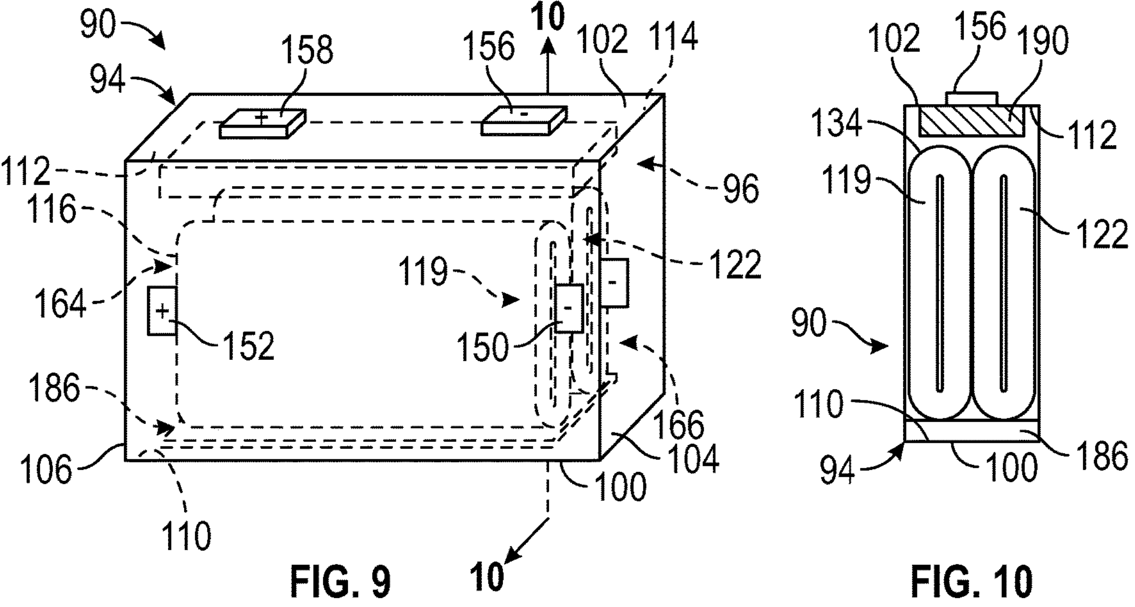
FIG. 9
FIG. 10

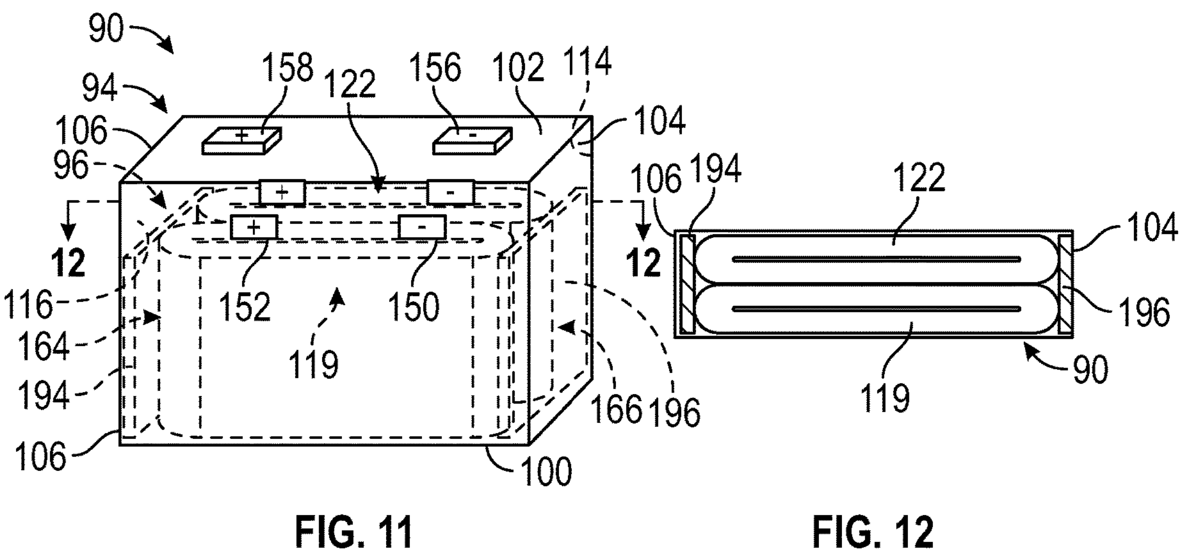
FIG. 11
FIG. 12
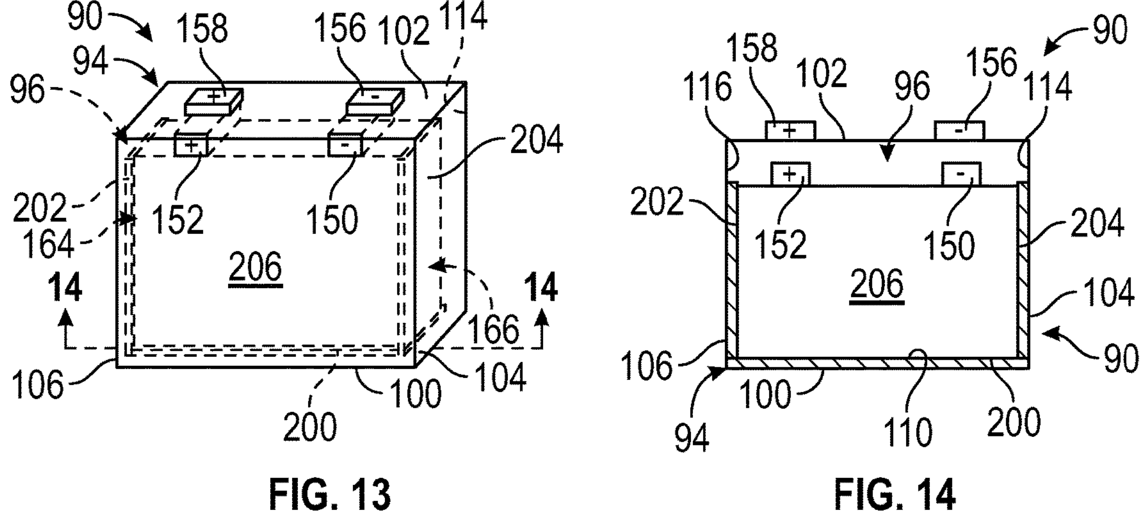
FIG. 13
FIG. 14

BATTERY CELL CAN INSERT

INTRODUCTION

The subject disclosure relates to the art of vehicles and, more particularly, to a battery cell can insert for a battery assembly that may be used to power a vehicle.

Battery assemblies are formed from a plurality of battery cells. The plurality of battery cells are arranged in a housing. Charging and discharging of the battery cells generates heat. The battery cells typically take the form of cell cans within which is arranged a cell stack supporting an anode connector and a cathode connector. In addition to the cell stack, an amount of electrolyte is arranged in the cell can. The electrolyte and the cell stack may not entirely fill the cell can. That is, there may be an amount of dead or unused space in the cell can.

The dead space may allow the cell stack to move. Further, the dead space may allow for gaps or spaces to exist or develop between the cell stack and interior surfaces of the cell can. The gaps could allow the cells stack to move around and become damaged. Further, the gaps could lead to less than desired heat transfer between the cell stack and the cell can. Poor heat transfer may result in internal cell temperatures exceeding design requirements. Accordingly, it is desirable to promote better support of the cell stack to reduce the potential for damage. It is also desirable to ensure a reliable heat transfer path between the cell stack and cell can surfaces to reduce internal cell can temperatures.

SUMMARY

A battery cell, in accordance with a non-limiting example, includes a cell can including a plurality of walls forming a cell stack receiving zone. Each of the plurality of walls includes an inner surface. A cell stack is arranged in the cell stack receiving zone. The cell stack has an outer surface that is spaced from the inner surface of at least one of the plurality of walls. A cell can insert is arranged between the outer surface of the cell stack and the inner surface of the at least one of the plurality of walls. The cell can insert provides structural support and a thermal flow path between the cell stack and the cell can.

In addition to one or more of the features described herein the cell stack includes a first outer surface and a second outer surface, and the cell can includes a first wall including a first inner surface and a second wall including a second inner surface, the cell can insert being arranged between at least one of the first inner surface and the first outer surface and the second inner surface and the second outer surface.

In addition to one or more of the features described herein the cell can insert includes a first cell can insert arranged between the first inner surface and the first outer surface and a second cell can insert arranged between the second inner surface and the second outer surface.

In addition to one or more of the features described herein the cell can insert includes a contoured inner surface portion and the one of the first outer surface and the second outer surface includes a contoured outer surface section that mates with the contoured inner surface portion.

In addition to one or more of the features described herein the cell can insert includes a generally rectangular cross-section.

In addition to one or more of the features described herein the first outer surface and the second outer surface define a continuous outer surface of the cell stack.

In addition to one or more of the features described herein the first outer surface defines a first end surface of the cell stack and the second outer surface defines a second end surface of the cell stack and the first inner surface defines a first side wall of the cell can and the second inner surface defines a second side wall of the cell can.

In addition to one or more of the features described herein the cell can insert is formed from one of a metallic material and a non-metallic material having a metallic coating.

In addition to one or more of the features described herein the cell can is formed from a first material and the cell can insert is formed from the first material.

In addition to one or more of the features described herein the cell can insert includes a solid cross-section.

A vehicle, in accordance with a non-limiting example, includes a body defining a passenger compartment, a plurality of wheels operatively connected to the body, an electric drive unit operatively connected to at least one of the plurality of wheels, and a battery assembly operatively connected to the electric drive unit. The battery assembly includes a plurality of battery cells. At least one of the plurality of battery cells includes a cell can including a plurality of walls forming a cell stack receiving zone. Each of the plurality of walls includes an inner surface. A cell stack is arranged in the cell stack receiving zone. The cell stack has an outer surface that is spaced from the inner surface of at least one of the plurality of walls. A cell can insert is arranged between the outer surface of the cell stack and the inner surface of the at least one of the plurality of walls. The cell can insert provides structural support and a thermal flow path between the cell stack and the cell can.

In addition to one or more of the features described herein the cell stack includes a first outer surface and a second outer surface, and the cell can includes a a first inner surface and a second inner surface, the cell can insert being arranged between at least one of the first inner surface and the first outer surface and the second inner surface and the second outer surface.

In addition to one or more of the features described herein the cell can insert includes a first cell can insert arranged between the first inner surface and the first outer surface and a second cell can insert arranged between the second inner surface and the second outer surface.

In addition to one or more of the features described herein the cell can insert includes a contoured inner surface portion and the one of the first outer surface and the second outer surface includes a contoured outer surface section that mates with the contoured inner surface portion.

In addition to one or more of the features described herein the cell can insert includes a generally rectangular cross-section.

In addition to one or more of the features described herein the first outer surface and the second outer surface define a continuous outer surface of the cell stack.

In addition to one or more of the features described herein the first outer surface defines a first end surface of the cell stack and the second outer surface defines a second end surface of the cell stack and the first inner surface defines a first side wall of the cell can and the second inner surface defines a second side wall of the cell can.

In addition to one or more of the features described herein the cell can insert is formed from one of a metallic material and a non-metallic material having a metallic coating.

In addition to one or more of the features described herein the cell can is formed from a first material and the cell can insert is formed from the first material.

In addition to one or more of the features described herein the cell can insert includes a solid cross-section.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 7 is a glass view of one of the plurality of battery cells having a cell can insert, in accordance with another non-limiting example;

FIG. 8 is a cross-sectional view of the battery cell of FIG. 6 taken through the line 8-8, in accordance with a non-limiting example;

FIG. 9 is a glass view of one of the plurality of battery cells having a cell can insert, in accordance with yet another non-limiting example;

FIG. 10 is a cross-sectional view of the battery cell of FIG. 9 taken through the line 10-10, in accordance with a non-limiting example;

FIG. 11 is a glass view of one of the plurality of battery cells having a cell can insert, in accordance with yet still another non-limiting example;

FIG. 12 is a cross-sectional view of the battery cell of FIG. 11 taken through the line 12-12, in accordance with a non-limiting example;

FIG. 13 is a glass view of one of the plurality of battery cells having a cell can insert, in accordance with still yet another non-limiting example; and FIG. 14 is a cross-sectional view of the battery cell of FIG. 13 taken through the line 14-14, in accordance with a non-limiting example.

DETAILED DESCRIPTION

Figure 1:
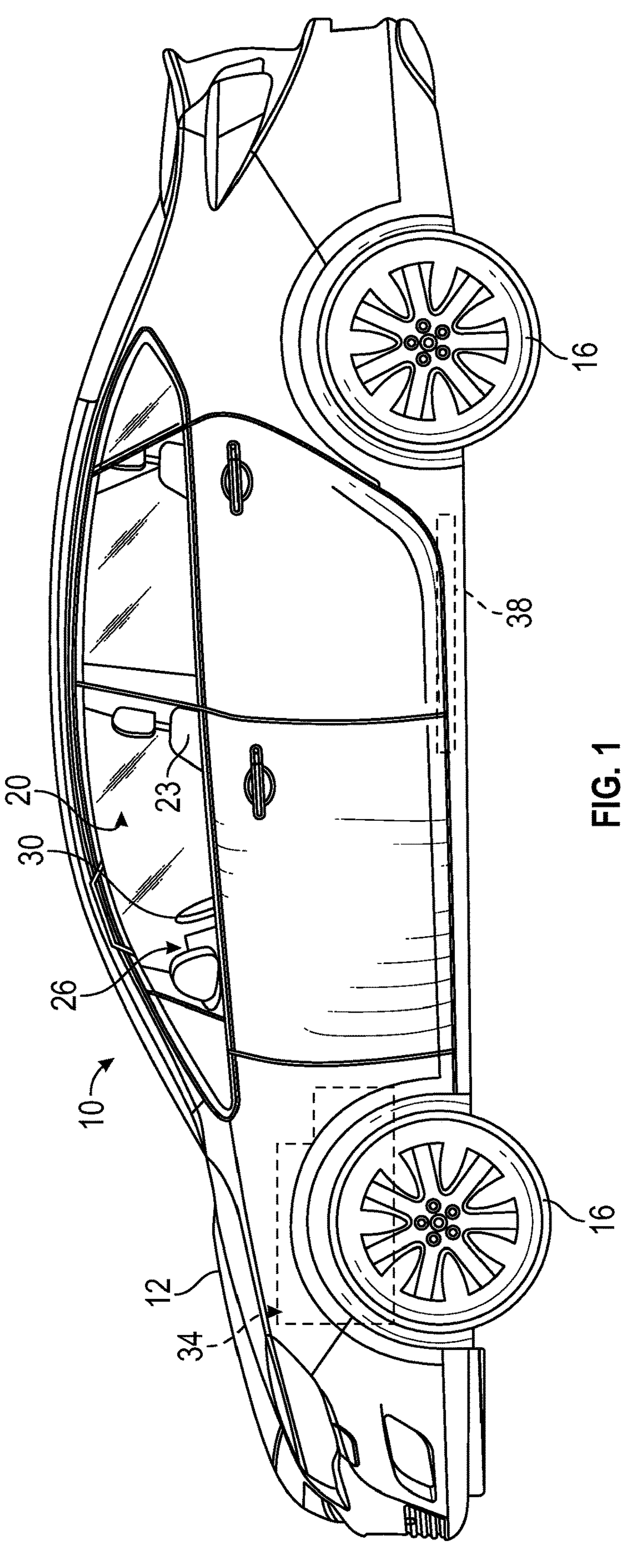
FIG. 1 is a left side view of a vehicle including a battery assembly having battery cells provided with a cell can insert, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having seats 23 positioned behind a dashboard 26. A steering control 30 is arranged between seats 23 and dashboard 26. Steering control 30 is operated to control orientation of select ones of the plurality of wheels 16. Vehicle 10 includes an electric drive unit 34 that provides power to one or more of the plurality of wheels 16.

Figure 2:
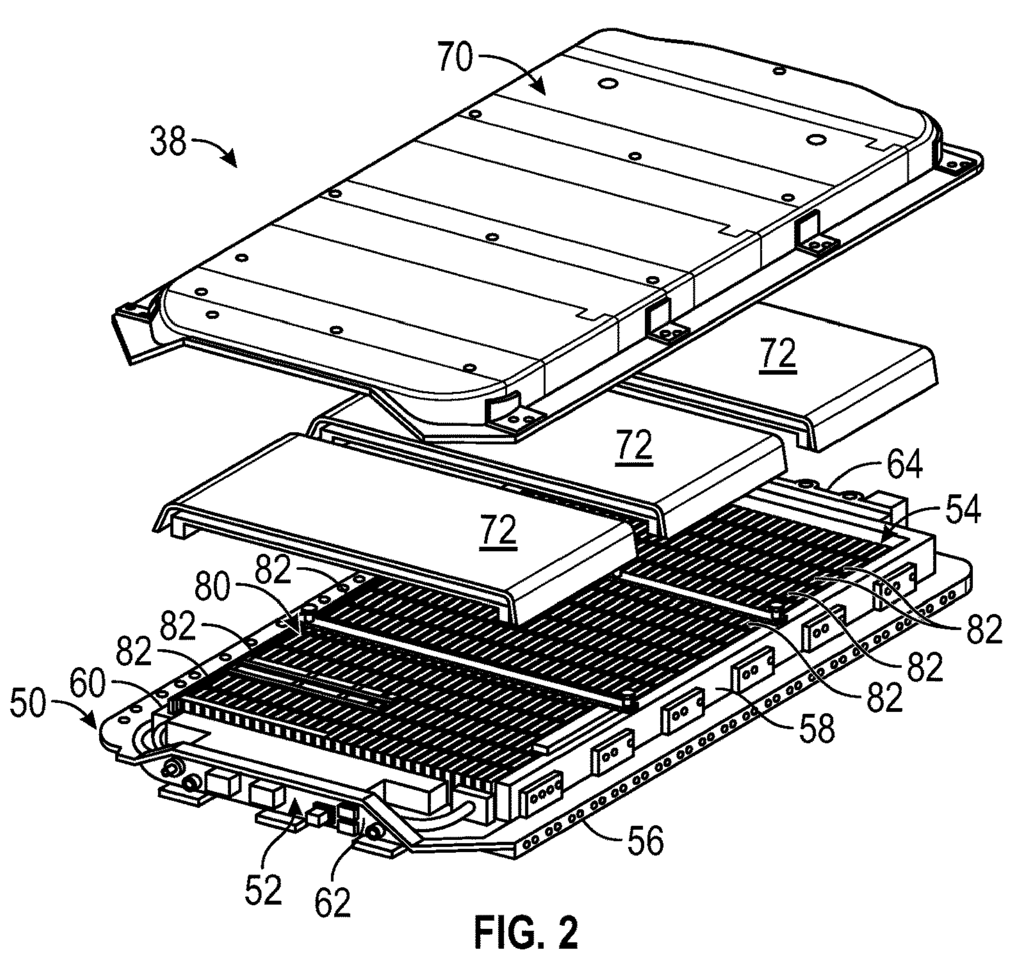
FIG. 2 is a disassembled view of the battery assembly having battery cells provided with a cell can insert, in accordance with a non-limiting example.

A rechargeable energy storage system (RESS) or battery assembly 38 is arranged in body 12 and provides power to electric drive unit 34. In other arrangements, a fuel cell (not shown) may be used to provide power to electric drive unit 34. At this point, it should be understood that the location of electric drive unit 34 and battery assembly 38 may vary. As shown in FIG. 2, battery assembly 38 includes a housing 50 having a plurality of wall members 52 that define a battery cell receiving zone 54. Plurality of wall members 52 include a base wall member 56, a first end wall member 58, a second end wall member 60, a first side wall member 62, and a second side wall member 64. First side wall member 62 and second side wall member 64 extend between and connect with first end wall member 58 and second end wall member 60.

Figure 3:
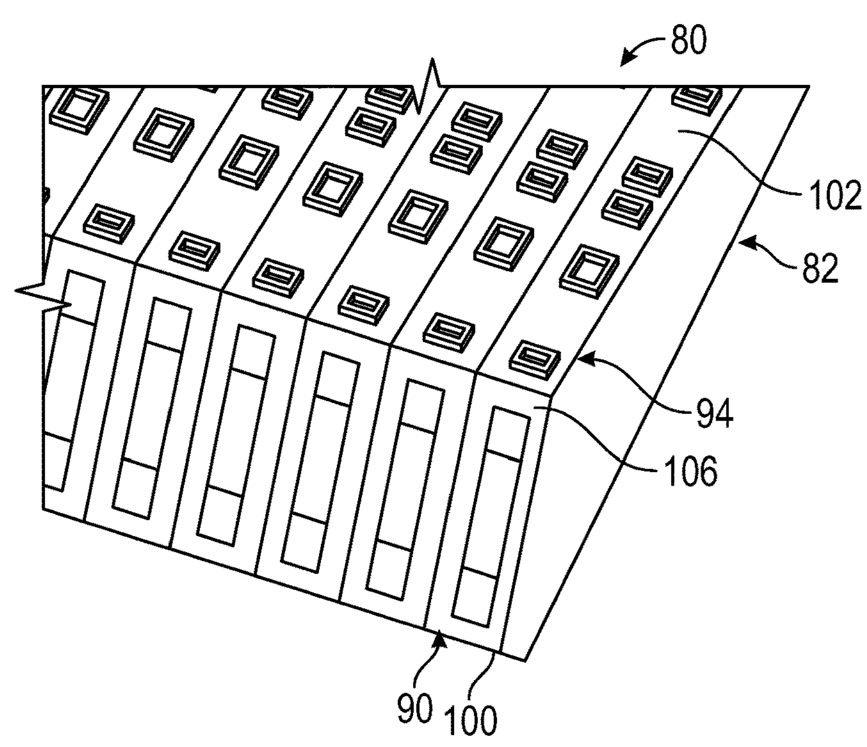
FIG. 3 is a partial perspective view of battery cells of the battery assembly of FIG. 2 in accordance with a non-limiting example.
Figures 4, 5, 6:
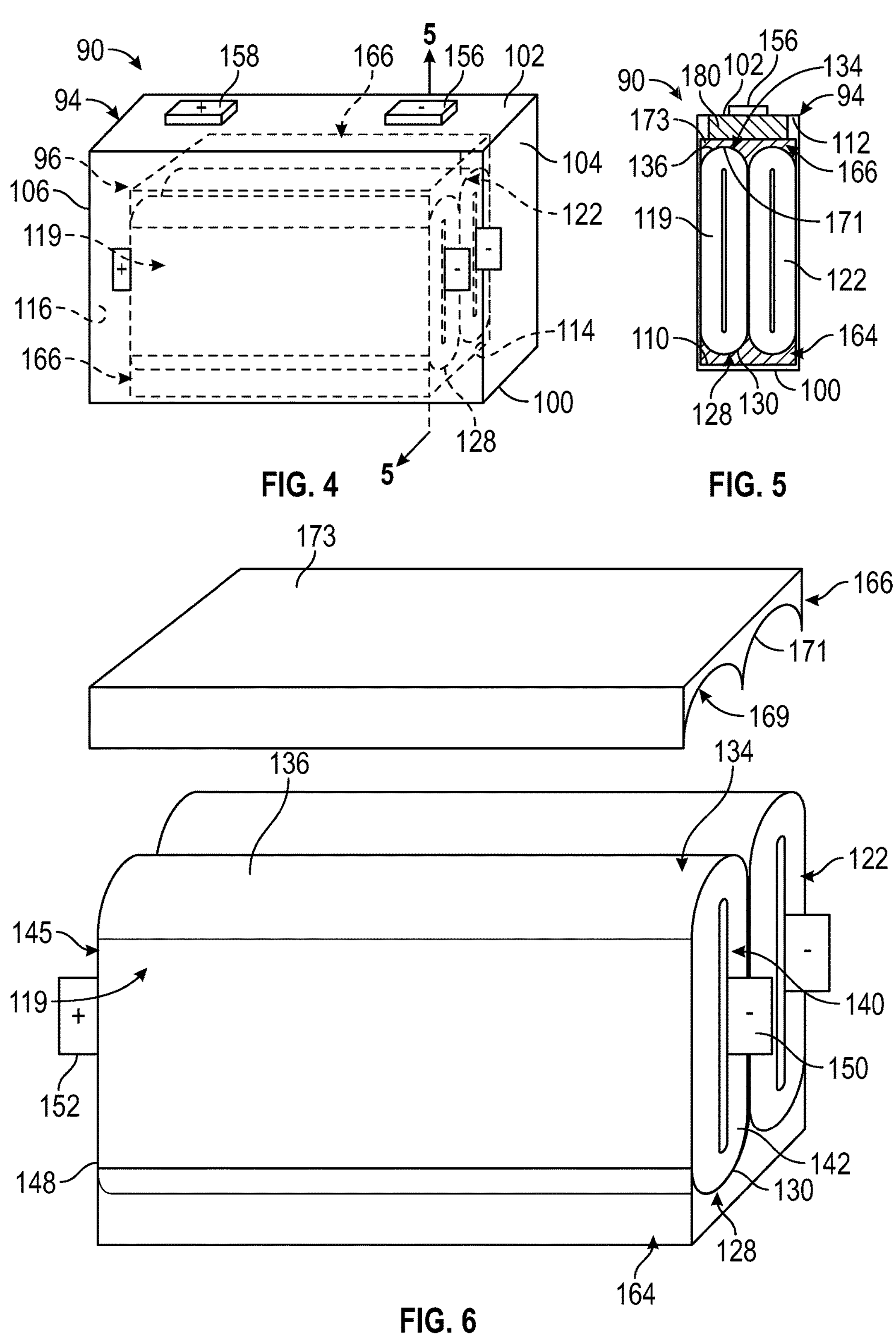
FIG. 4 is a glass view of one of the plurality of battery cells having a battery stack and cell can insert, in accordance with a non-limiting example.
FIG. 5 is a cross-sectional view of the battery cell of FIG. 4 taken through the line 5-5, in accordance with a non-limiting example.
FIG. 6 is a disassembled view of the battery stack of FIG. 4, in accordance with a non-limiting example.

In a non-limiting example, housing 50 may include an outer cover 70 and a number of inner covers 72. Inner covers 72 shield a plurality of battery cells 80 arranged in a number of adjacent rows 82. In a non-limiting example shown in FIGS. 3, 4, and 5, each of the plurality of battery cells 80 includes a cell can 90 formed from a plurality of walls 94 that define a cell stack receiving zone 96 (FIG. 4). In a non-limiting example, cell can 90 is formed from metal that is non-reactive with an electrolyte. Plurality of walls 94 includes a bottom or base wall 100, an upper or electrode support wall 102, a first side wall 104 (FIG. 4), and a second side wall 106. Plurality of walls 94 also includes a third side wall and a fourth side wall (not separately labeled).

In a non-limiting example illustrated in FIGS. 4 and 5, base wall 100 includes a first inner surface 110, electrode support wall 102 includes a second inner surface 112, first side wall 104 includes a third inner surface 114, and second side wall 106 includes a fourth inner surface 116. A first cell stack 119 and a second cell stack 122 are arranged in cell stack receiving zone 96 of cell can 90. As first cell stack 119 and second cell stack 122 are substantially similar, a detailed description will follow with reference to first cell stack 119 with an understanding that second cell stack 122 is similarly formed.

In a non-limiting example illustrated in FIG. 6, first cell stack 119 includes a first side surface 128 that is arranged adjacent to first inner surface 110. First side surface 128 defines a first contoured outer surface 130. First cell stack 119 is also shown to include a second side surface 134 that is arranged adjacent to second inner surface 112. Second side surface 134 forms a second contoured outer surface 136. In the non-limiting example shown, first cell stack 119 takes the form of a jelly roll stack (not separately labeled) such that first contoured outer surface 130 and second contoured outer surface 136 form a continuous outer surface (also not separately labeled). First cell stack 119 is also shown to include a first end 140 having a first end surface 142 and a second end 145 having a second end surface 148. A first electrode 150 extends outwardly from first end 140 and a second electrode 152 extends outwardly from second end 145. First electrode 150 and second electrode 152 are electrically connected to a first battery terminal 156 and a second battery terminal 158 provided on electrode support wall 102.

In a non-limiting example, cell can 90 includes a first cell can insert 164 arranged between first side surface 128 and first inner surface 110 and a second cell can insert 166 arranged between second side surface 134 and second inner surface 112. In the non-limiting example shown in FIGS. 4, 5, and 6, first cell can insert 164 and second cell can insert 166 are substantially similarly formed. As such, the discussion will follow referencing FIG. 6 and second cell can insert 166 with an understanding that first cell can insert 164 includes similar structure.

Referring to FIG. 6, second cell can insert 166 includes an inner surface portion 169 having a contoured inner surface portion 171 that is receptive of second contoured outer surface 136 of first cell stack 119 and a second contoured outer surface section (not separately labeled) of second cell stack 122, and an outer surface portion 173 that is substantially planar. First cell can insert 166 fills dead spaces that may exist between first cell stack 119 and second cell stack 122 and second inner surface 112. First cell can insert 164 also supports first cell stack 119 and second cell stack 122. Second cell can insert 166 likewise supports first cell stack 119 and second cell stack 122. A top or cap plate assembly 180, FIG. 5, is arranged between second cell can insert 166 and first inner surface 110.

In addition to providing support for first cell stack 119 and second cell stack 122, first cell can insert 164 and second cell can insert 166 also provide a heat exchange pathway. That is, first cell can insert 164 and second cell can insert 166 are formed from a material that conducts heat from first cell stack 119 and second cell stack 122 to the plurality of walls 94 forming cell can 90. In a non-limiting example, first cell can insert 164 and second cell can insert 166 may be formed from the same material used to form cell can 90 such as a metallic material. In another non-limiting example, first cell can insert 164 and second cell can insert 166 may be formed from a non-metallic material having a metallic coating or be coated with a material that conducts heat. First cell can insert 164 and second cell can insert 166 may have a solid cross-section as shown or may be hollow. If hollow, first cell can insert 164 and second cell can insert 166 may possess a void or may be filled with a heat conducting material.

At this point, it should be understood that while shown as being supporting first battery stack 119 and second battery stack 122 between first inner surface 110 and second inner surface 112, first cell can insert 164 and second cell can insert 166 may be arranged in other configurations such as shown in FIGS. 7 and 8. For example, first cell can insert 164 may be positioned to fill a gap that exists between first cell stack 119 and second cell stack 122 and third inner surface 116. Similarly, second cell can insert 166 may be arranged to fill a gap that exists between first cell stack 119 and second cell stack 122 and fourth inner surface 114.

As shown in FIGS. 9 and 10, cell can 90 may include a single cell can insert 186 having a generally rectangular cross-section. Cell can insert 186 may be arranged between first cell stack 119 and second cell stack 122 and first inner surface 110 as shown in FIGS. 9 and 10. A top or plate assembly 190 may be arranged between first cell stack 119 and second cell stack 122 and second inner surface 112. FIGS. 11 and 12 show two cell can inserts 194 and 196 each having a rectangular cross-section arranged between first cell stack 119 and second cell stack 122 and third inner surface 114 and fourth inner surface 116 respectively. Still further, cell can inserts, such as shown at 200, 202, and 204 may be arranged between a prismatic cell can 206 and corresponding ones of first inner surface 110, third inner surface 114, and fourth inner surface 116 as shown in FIGS. 13 and 14.

The cell can inserts in accordance with the non-limiting examples described in accordance with non-limiting examples provide structural support for each cell that may help reduce cell stack damage that may occurs during sudden and unexpected vehicle decelerations. Further, in addition to providing structural support, the cell can inserts form a bridge through air gaps and electrolyte between internal battery components and cell can surfaces. The bridge creates a thermal flow path that conducts heat from the internal battery components to the cell can in order to be exchanged in the battery housing and reduce cell can temperatures.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A battery cell defining a vertical direction and a horizontal direction orthogonal to the vertical direction, the battery cell comprising:

a cell can including a plurality of walls forming a cell stack receiving zone, the plurality of walls comprising an upper wall and a lower wall opposite each other in the vertical direction, each of the plurality of walls including an inner surface;

a cell stack arranged in the cell stack receiving zone, the cell stack having an upper outer surface that is spaced from the inner surface of the upper wall and a lower outer surface that is spaced from the inner surface of the lower wall;

an upper cell can insert arranged between the upper outer surface of the cell stack and the inner surface of the upper wall of the cell can; and a lower cell can insert arranged between the lower outer surface of the cell stack and the inner surface of the lower wall of the cell can, wherein the upper and lower cell can inserts provide structural support and thermal flow paths between the cell stack and the cell can, wherein first and second battery terminals are disposed on the upper wall of the cell can, wherein the cell stack includes electrode tabs extending from opposite sides thereof in the horizontal direction, and wherein the upper and lower cell can inserts are separated from each other in the vertical direction.

2. The battery cell according to claim 1, wherein the lower cell can insert includes a contoured inner surface portion, and wherein the lower outer surface includes a contoured outer surface section that mates with the contoured inner surface portion.

3. The battery cell according to claim 1, wherein each of the upper and lower cell can inserts includes a generally rectangular cross-section.

4. The battery cell according to claim 1, wherein the upper outer surface and the lower outer surface, together with side outer surfaces, define a continuous outer surface of the cell stack.

5. The battery cell according to claim 1, wherein each of the upper and lower cell can inserts is formed from one of a metallic material and a non-metallic material having a metallic coating.

6. The battery cell according to claim 1, wherein the cell can is formed from a first material and each of the upper and lower cell can inserts is formed from the first material.

7. The battery cell according to claim 1, wherein each of the upper and lower cell can inserts includes a solid cross-section.

8. The battery cell according to claim 1, wherein the upper cell can insert includes a contoured inner surface portion, and wherein the upper outer surface includes a contoured outer surface section that mates with the contoured inner surface portion.

9. The battery cell according to claim 1, wherein the first and second battery terminals are spaced apart from each other along the horizontal direction.

10. The battery cell according to claim 1, wherein the lower cell can insert is in direct contact with the lower wall of the cell can and the lower outer surface of the cell stack, and the upper cell can insert is in direct contact the upper outer surface of the cell stack and a top plate assembly, the top plate assembly disposed between the upper wall of the cell can and the upper cell can insert.

11. A vehicle comprising:

a body defining a passenger compartment;

a plurality of wheels operatively connected to the body;

an electric drive unit operatively connected to at least one of the plurality of wheels; and a battery assembly operatively connected to the electric drive unit, the battery assembly including a plurality of battery cells, at least one of the plurality of battery cells defining a vertical direction and a horizontal direction orthogonal to the vertical direction and comprising:

a cell can including a plurality of walls forming a cell stack receiving zone, the plurality of walls comprising an upper wall and a lower wall opposite each other in the vertical direction, each of the plurality of walls including an inner surface;

a cell stack arranged in the cell stack receiving zone, the cell stack having an upper outer surface that is spaced from the inner surface of the upper wall and a lower outer surface that is spaced from the inner surface of the lower wall;

an upper cell can insert arranged between the upper outer surface of the cell stack and the inner surface of the upper wall of the cell can; and a lower cell can insert arranged between the lower outer surface of the cell stack and the inner surface of the lower wall of the cell can, wherein the upper and lower cell can inserts provide structural support and thermal flow paths between the cell stack and the cell can, wherein first and second battery terminals are disposed on the upper wall of the cell can, wherein the cell stack includes electrode tabs extending from opposite sides thereof in the horizontal direction, and wherein the upper and lower cell can inserts are separated from each other in the vertical direction.

12. The vehicle according to claim 11, wherein the lower cell can insert includes a contoured inner surface portion, and wherein the lower outer surface includes a contoured outer surface section that mates with the contoured inner surface portion.

13. The vehicle according to claim 11, wherein each of the upper and lower cell can inserts includes a generally rectangular cross-section.

14. The vehicle according to claim 11, wherein the upper outer surface and the lower outer surface, together with side outer surfaces, define a continuous outer surface of the cell stack.

15. The vehicle according to claim 11, wherein each of the upper and lower cell can inserts is formed from one of a metallic material and a non-metallic material having a metallic coating.

16. The vehicle according to claim 11, wherein the cell can is formed from a first material and each of the upper and lower cell can inserts is formed from the first material.

17. The vehicle according to claim 11, wherein each of the upper and lower cell can inserts includes a solid cross-section.

18. The vehicle according to claim 11, wherein the upper cell can insert includes a contoured inner surface portion, and wherein the upper outer surface includes a contoured outer surface section that mates with the contoured inner surface portion.

19. The vehicle according to claim 11, wherein the first and second battery terminals are spaced apart from each other along the horizontal direction.

20. The vehicle according to claim 11, wherein the lower cell can insert is in direct contact with the lower wall of the cell can and the lower outer surface of the cell stack, and the upper cell can insert is in direct contact the upper outer surface of the cell stack and a top plate assembly, the top plate assembly disposed between the upper wall of the cell can and the upper cell can insert.

* * * * *